United States Patent
Zuo et al.

(10) Patent No.: US 7,407,414 B2
(45) Date of Patent: Aug. 5, 2008

(54) SURFACE CONTACT CARD HOLDER

(75) Inventors: Zhou-Quan Zuo, Shenzhen (CN); Chia-Hua Chen, Taipei Hsien (TW)

(73) Assignee: Shenzhen Futaihong Precision Industry Co., Ltd., ShenZhen, Guangdong Province (CN)

(*) Notice: Subject to any disclaimer, the term of this patent is extended or adjusted under 35 U.S.C. 154(b) by 0 days.

(21) Appl. No.: 11/559,814

(22) Filed: Nov. 14, 2006

(65) Prior Publication Data

US 2007/0128913 A1  Jun. 7, 2007

(30) Foreign Application Priority Data

Dec. 2, 2005  (CN)  ............ 2005 1 0102025.3

(51) Int. Cl.
  *H01R 24/00* (2006.01)
(52) U.S. Cl. .................................... 439/630
(58) Field of Classification Search ............ 439/630, 439/631, 159, 327, 325; 455/558; 235/441, 235/332; 361/719
  See application file for complete search history.

(56) References Cited

U.S. PATENT DOCUMENTS

| | | | | |
|---|---|---|---|---|
| 6,101,372 A * | 8/2000 | Kubo | .......... | 455/558 |
| 6,761,591 B1 * | 7/2004 | Zhou | .......... | 439/630 |
| 6,888,724 B2 * | 5/2005 | Shaie | .......... | 361/719 |
| 6,969,282 B2 * | 11/2005 | Liu | .......... | 439/630 |
| 7,086,887 B2 * | 8/2006 | Tsai et al. | .......... | 439/331 |
| 7,123,886 B2 * | 10/2006 | Morita | .......... | 455/90.3 |
| 7,131,871 B1 * | 11/2006 | Zuo et al. | .......... | 439/630 |
| 7,160,131 B1 * | 1/2007 | Zuo et al. | .......... | 439/331 |

* cited by examiner

*Primary Examiner*—Alexander Gilman (57) ABSTRACT

An exemplary surface contact card holder (800) for holding a surface contact card (40) includes a body (10) and a guiding mechanism (20). The body has a receiving space (105) therein. The guiding mechanism is movably provided in the receiving space. The guiding mechanism is configured for selectably one of retaining the surface contact card in the receiving space and withdrawing the surface contact card from the receiving space. The guiding mechanism includes a pulling lever (201) and a spring element (202). One end of the spring element is fixed on the pulling lever and the other end of the spring element resists the body. The spring element is pressed when the guiding mechanism is pushed out from the receiving space. The guiding mechanism automatically returns to its original position by rebounding of the spring element.

20 Claims, 7 Drawing Sheets

SURFACE CONTACT CARD HOLDER

BACKGROUND OF THE INVENTION

1. Field of the Invention

The present invention generally relates to mechanisms for holding card members in an electronic device and, particularly, to a surface contact card holder for holding a surface contact card in a portable electronic device.

2. Description of Related Art

With the development of wireless communication and information processing technologies, portable electronic devices such as mobile phones are now in widespread use. These electronic devices enable consumers to enjoy high-tech services, anytime and anywhere. Surface contact cards having special circuits are widely used in portable electronic devices to enhance or specialize the functions of the portable electronic devices. For example, a subscriber identity module (SIM) card can be placed in a mobile phone to dedicate the mobile phone's functions to the SIM card owner. By changing SIM cards, a single mobile phone can be used as a personal phone by many different SIM card owners.

Figure 7:
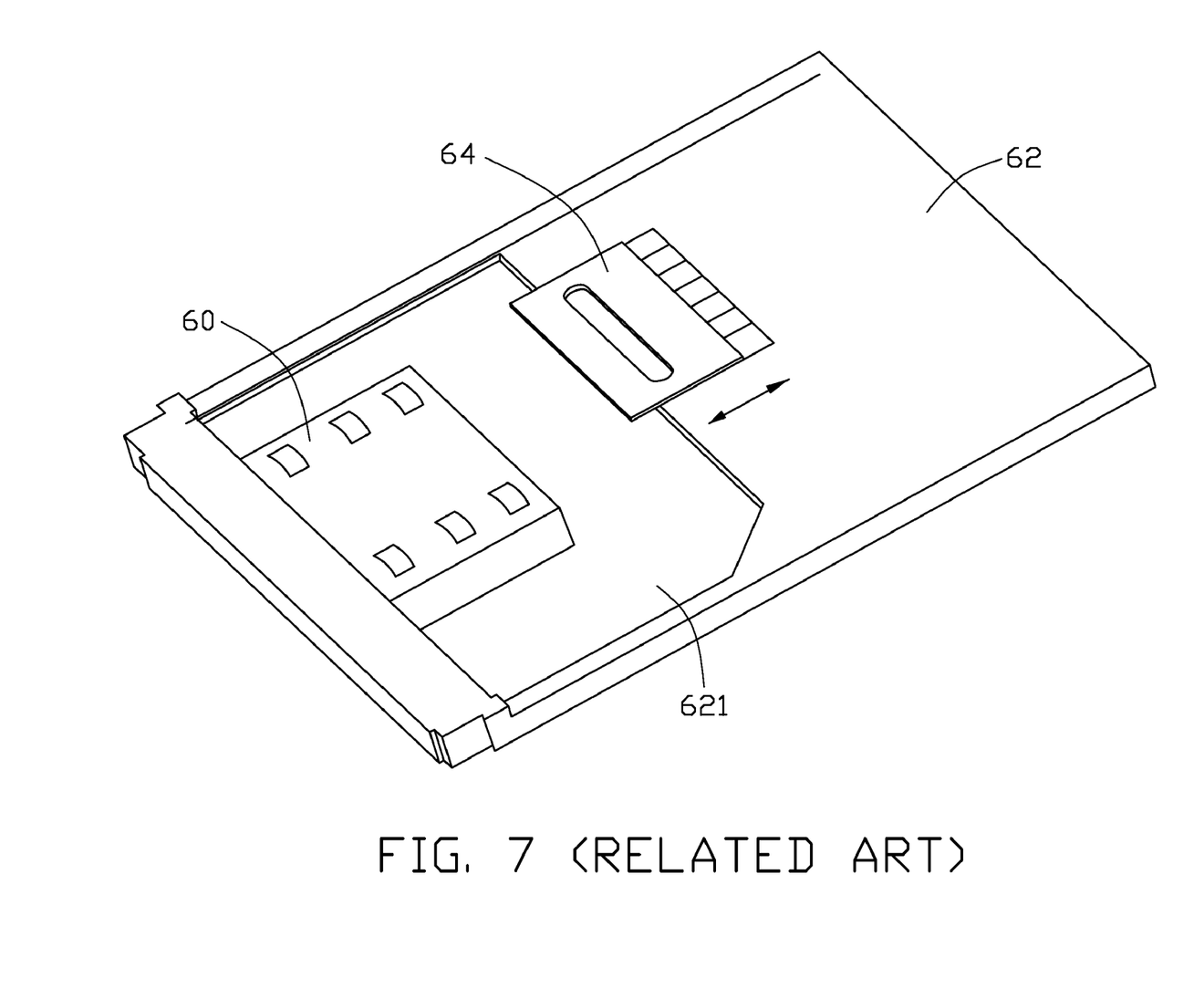
FIG. 7 is an exploded, isometric view of a conventional SIM card holder from the related art.

Referring now to FIG. 7, a conventional mechanism for holding a SIM card therein includes a base 62 made of an insulating material and a holding structure 64. The base 62 defines a receiving groove 621 and a SIM connector 60 and further includes a plurality of contacts set in the middle of the receiving groove 621. The shape and size of the receiving groove 621 are the same as those of the SIM card, thus allowing the receiving groove 621 to accommodate the SIM card therein. The holding structure 64 is located adjacent to one end of the receiving groove 621 and can be moved back and forth along the direction indicated by the arrow shown in FIG. 7.

In use, firstly, the holding structure 64 is moved away from the receiving groove 421, and the SIM card is inserted into the receiving groove 621. Then, the holding structure 64 is moved to a position adjacent the receiving groove 621, so as to latch the SIM card in the receiving groove 621. In the same way, the SIM card can be released by moving the holding structure 64 away from the receiving groove 621.

In the above conventional mechanism, the holding structure 64 can be easily moved. If a mobile phone employing such a mechanism for holding a SIM card drops to ground, the mechanical shock/impact can, oftentimes, be sufficient to force the holding structure 64 to move off the receiving groove 621. As a result, the SIM card will not connect well with the SIM contactor 60 in such an instance and may even be released from the receiving groove 621. Clearly, such a conventional mechanism cannot hold the SIM card steadily in the receiving groove 621.

Therefore, a new surface contact card holder is desired in order to overcome the above-described shortcomings.

SUMMARY OF THE INVENTION

In one embodiment, a surface contact card holder configured (i.e., structured and arranged) for holding a surface contact card includes a body having a receiving space therein; and a spring-loaded guiding mechanism. The guiding mechanism is movably attached to the body and is particularly provided in the receiving space. The guiding mechanism is configured for selectably one of retaining the surface contact card in the receiving space and withdrawing the surface contact card from the receiving space. The guiding mechanism includes a pulling lever and a spring element. One end of the spring element is fixed on the pulling lever and the other end of the spring element resists the body. The spring element is pressed when the guiding mechanism is pushed out from the receiving space. The guiding mechanism automatically returns to its original position by rebounding of the spring element.

Other advantages and novel features will become more apparent from the following detailed description when taken in conjunction with the accompanying drawings.

BRIEF DESCRIPTION OF THE DRAWINGS

Many aspects of the surface contact card holder can be better understood with reference to the following drawings. The components in the drawings are not necessarily drawn to scale, the emphasis instead being placed upon clearly illustrating the principles of the present surface contact card holder. Moreover, in the drawings, like reference numerals designate corresponding parts throughout the several views.

DETAILED DESCRIPTION OF THE INVENTION

Figure 1:
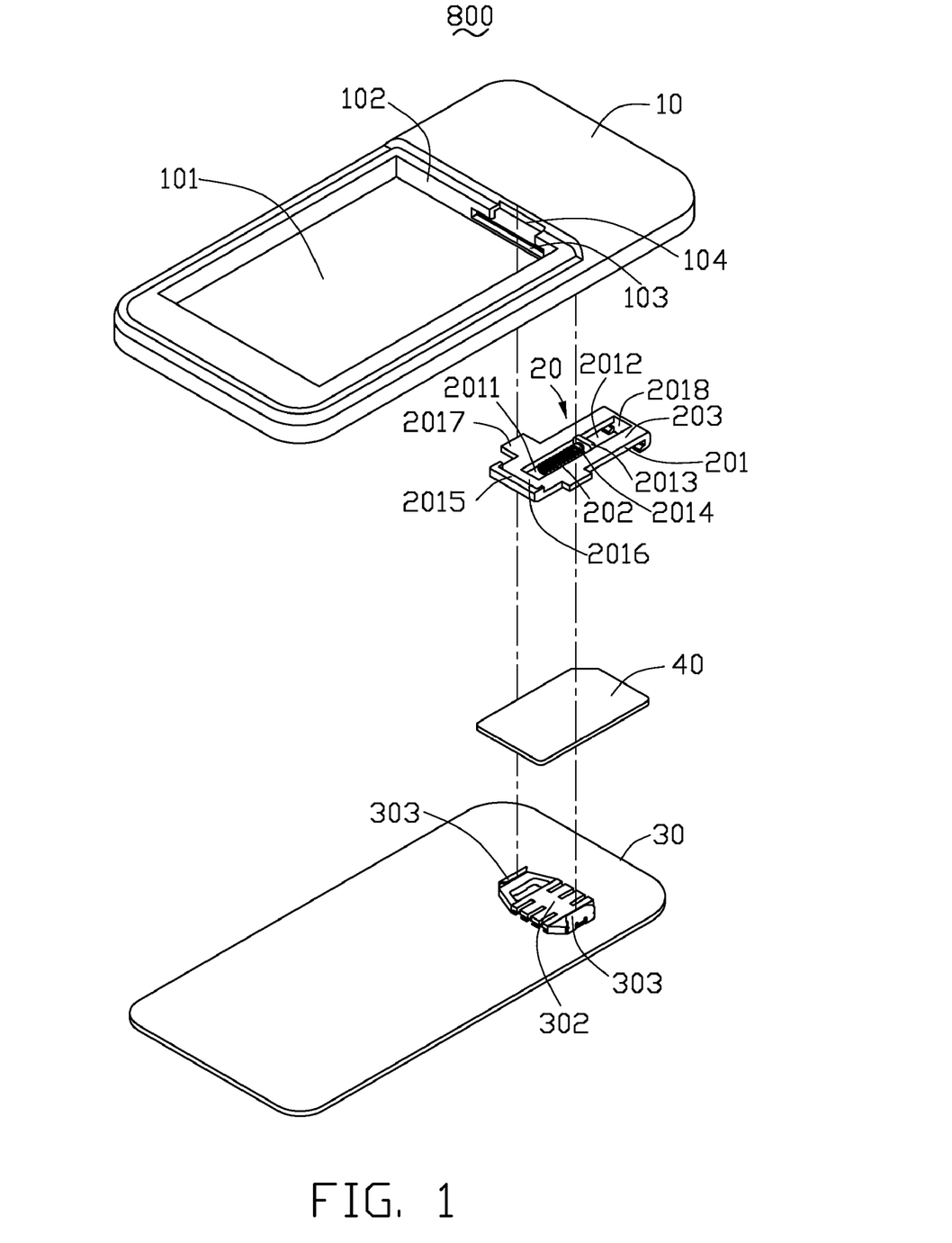
FIG. 1 is an exploded, isometric view of a surface contact card holder, with a surface contact card, in accordance with a preferred embodiment.
Figure 2:
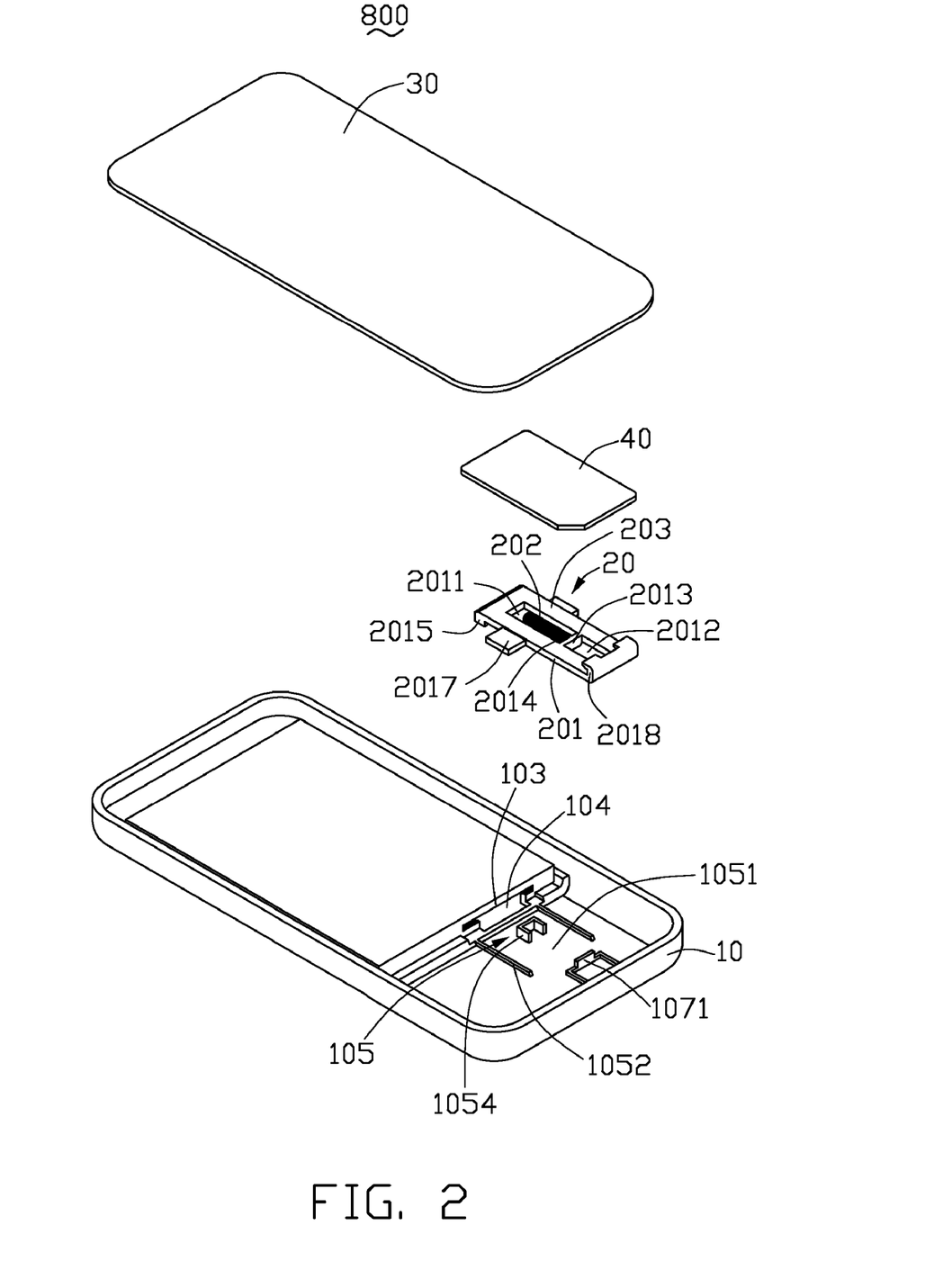
FIG. 2 is similar to FIG. 1, showing another direction of the surface contact card holder, with the surface contact card.

The present surface contact card holder can be used for holding surface contact cards, such as SIM cards, compact flash cards (CFs), multimedia cards (MMCs), and so on. In a preferred embodiment of the present invention, FIGS. 1-2 show a surface contact card holder 800 configured for holding a surface contact card 40 therein. The surface contact card holder 800 includes a body 10 and a guiding mechanism 20. The body 10 is provided with a receiving space 105, which essentially matches the shape of the surface contact card 40. The guiding mechanism 20 together with the surface contact card 40 can be operated to move in the receiving space 105. The body 10 defines a battery cavity 101 and an associated inner side wall 102. The battery cavity 101 is substantially rectangular in shape.

A card entrance 103 is formed on the inner side wall 102. The card entrance 103 has a slightly greater width and height than that of the surface contact card 40, permitting a close clearance fit therebetween. The battery cavity 101 communicates with the receiving space 105 through the card entrance 103. A channel 104 is formed on the inner side wall 102 above the card entrance 103, and the channel 104 has a smaller width than that of the card entrance 103. The receiving space 105 is bounded with a bottom wall 1051, two opposing side boards 1052, and an upright plate 1053 of the body 10; and a printed circuit board 30. The side boards 1052 and the upright plate 1053 are formed on the bottom wall 1051 and project away from (i.e., extend directly from) a surface of the bottom wall 1051. A distance between the two side boards 1052 is similar to the width of the card entrance 103, providing a clearance fit for the surface contact card 40. Such a clearance fit permits sliding of the surface contact card 40 relative to the side boards 1052 and the card entrance 103 only when a sufficient force is used to initiate the sliding. A U-shaped resisting plate 1054 is formed on the bottom wall 1051, near the card entrance 103. A surface contact card connector 302 is formed on the printed circuit board 30 and faces the receiving space 105. Two guide plates 303 are formed at two opposing sides of the surface contact card connector 302. Each side board 1052 corresponds to a guide plate 303 of the printed circuit board 30.

The guiding mechanism 20 includes a pulling lever 201 and a spring element 202. The pulling lever 201 has a main lever body 203. The main lever body 203 is a rectangular plate, and a width of the main lever body 203 is slightly smaller than the width of the channel 104. The main lever body 203 has a first rectangular hole 2011 and a second rectangular hole 2012 defined therein. A clapboard 2013 extends from the main lever body 203 and is located between the two holes 2011, 2012. A fastening post 2014 is formed on the clapboard 2013, projecting into the first rectangular hole 2011. One end of the spring element 202 (e.g., a coil spring, an elastomeric element, or other known spring member) is fastened on the fastening post 2014. An operating portion 2015 is formed on one end of the main lever body 203 projecting upward from the main lever body 203. The operating portion 2015 has a concavity 2016 corresponding to the channel 104. A hook portion 2018 is formed on another end of the main lever body 203 and projects downwardly from the main lever body 203. The operating portion 2015 is configured for facilitating the movement of the lever 201 within/through the receiving space 105, and the hook portion 2018 is configured for holding and biasing one end of the surface contact card 40. The combination of the operating portion 2015 and the hook portion 2018 allows a user to selectably dislodge, by pulling upon the operating portion 2015, a given surface contact card 40 from within the receiving space 105 through the card entrance 103. Two slide plates 2017 are formed at two opposing sides of the main lever body 203. The slide plates 2017 are configured for sliding along the side boards 1052 and the guide plates 303.

Figure 3:
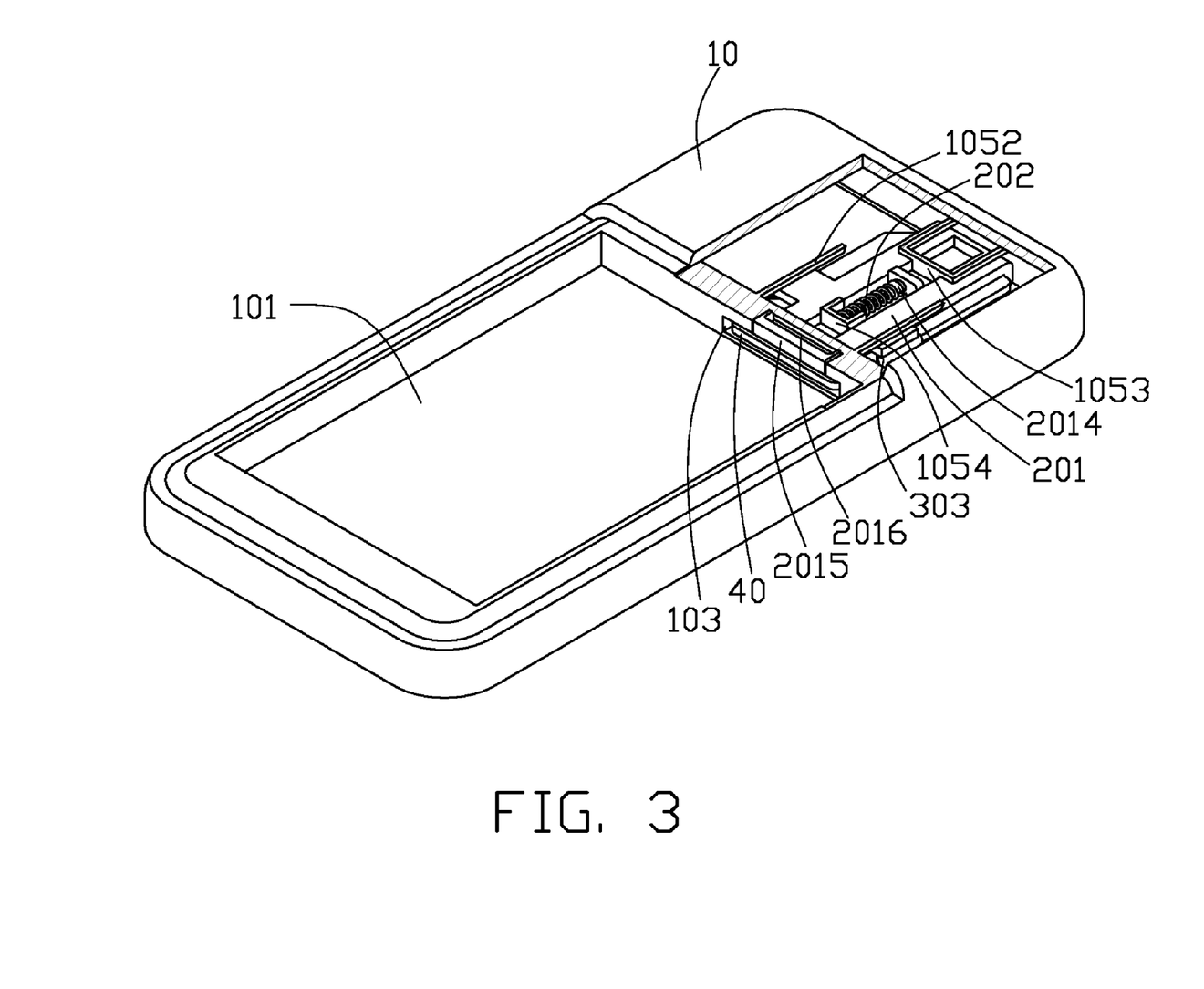
FIG. 3 is an assembled, cut-away view of the surface contact card holder, with the surface contact card.

Referring to FIG. 3, in assembly, firstly, the spring element 202 is secured on the fastening post 2014 of the lever 201 to form the guiding mechanism 20. Secondly, the guiding mechanism 20 is disposed in the receiving space 105 of the body 10, the slide plates 2017 are placed on the side boards 1052, the upright plate 1053 extends into the second rectangular hole 2012, and the operating portion 2015 protrudes outwardly from the receiving space 105 from channel 104 to be exposed for operation by a user. Note that the upright plate 1053 effectively limits the potential travel path of the clapboard 2013 and hook portion 2018 (at opposing ends of the second rectangular hole 2012). Thirdly, the printed circuit board 30 is secured on the body 10, a portion of the printed circuit board 30 covers the receiving space 105, the Surface contact card connector 302 faces the receiving space 105, and the guide plates 303 resist the slide plates 2017 and, thus, are able to guide their movement.

Figure 4:
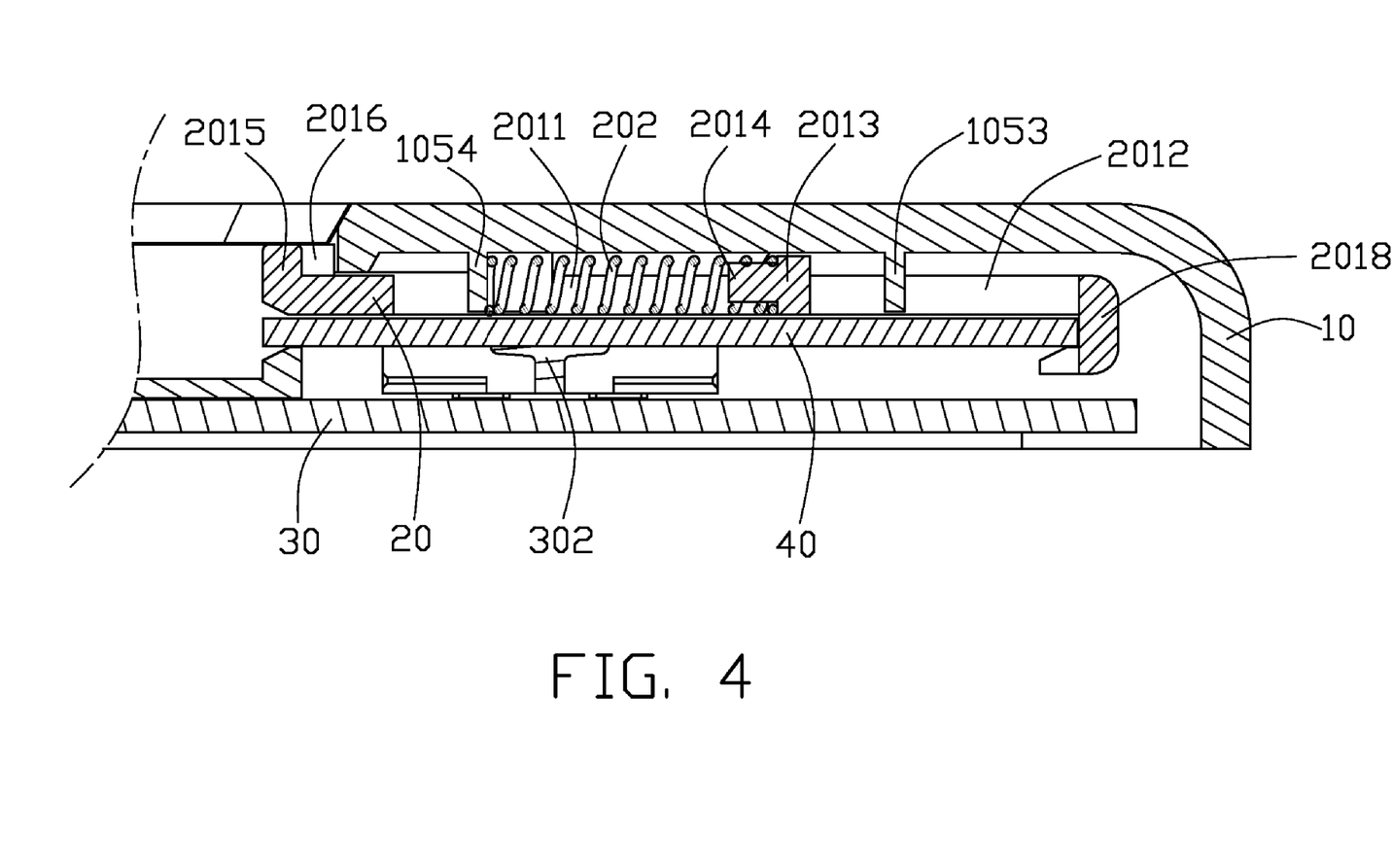
FIG. 4 is an enlarged, cut-away view of the surface contact holder, showing the surface contact card holder in a first position.

Referring to FIG. 4, in use, firstly, the surface contact card 40 is inserted into the receiving space 105 through the card entrance 103. Secondly, the surface contact card 40 is pushed into the receiving space 105 until the surface contact card 40 resists (i.e., bears against) the hook portion 2018 of the pulling lever 201, with the hook portion 2018 at its maximum insert position (i.e., maximum separation from the upright plate 1053). Because the surface contact card connector 302 is elastic (i.e., sufficiently deformable), the surface contact card 40 will contact and slidably engage upon the surface contact card connector 302 after it is inserted into the receiving space 105. In the fully inserted state, the spring element 202 is fully extended (i.e., in its "at rest" position) in the receiving space 105.

Figure 5:
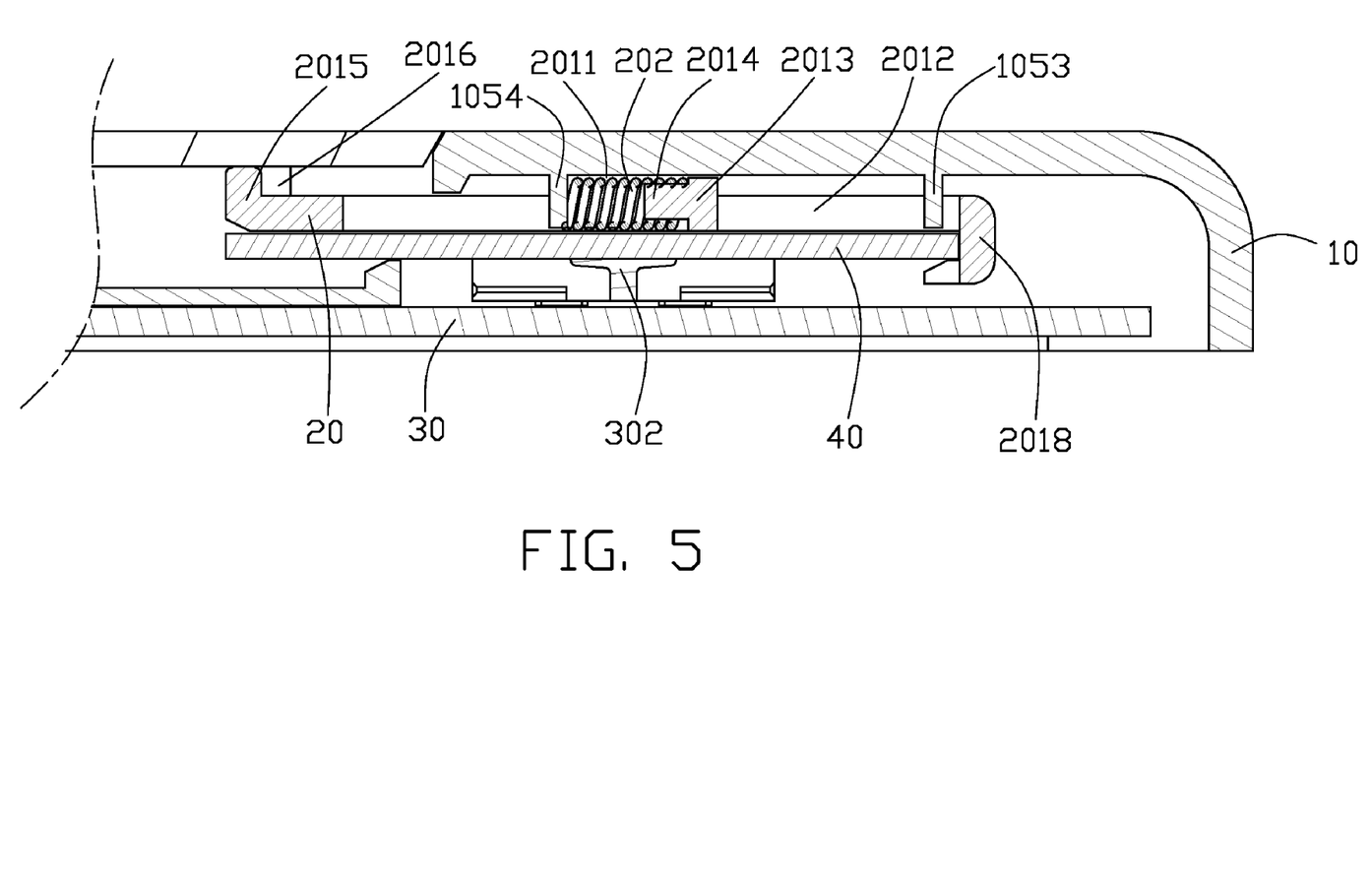
FIG. 5 is similar to FIG. 4, but showing the surface contact card holder in a second position.
Figure 6:
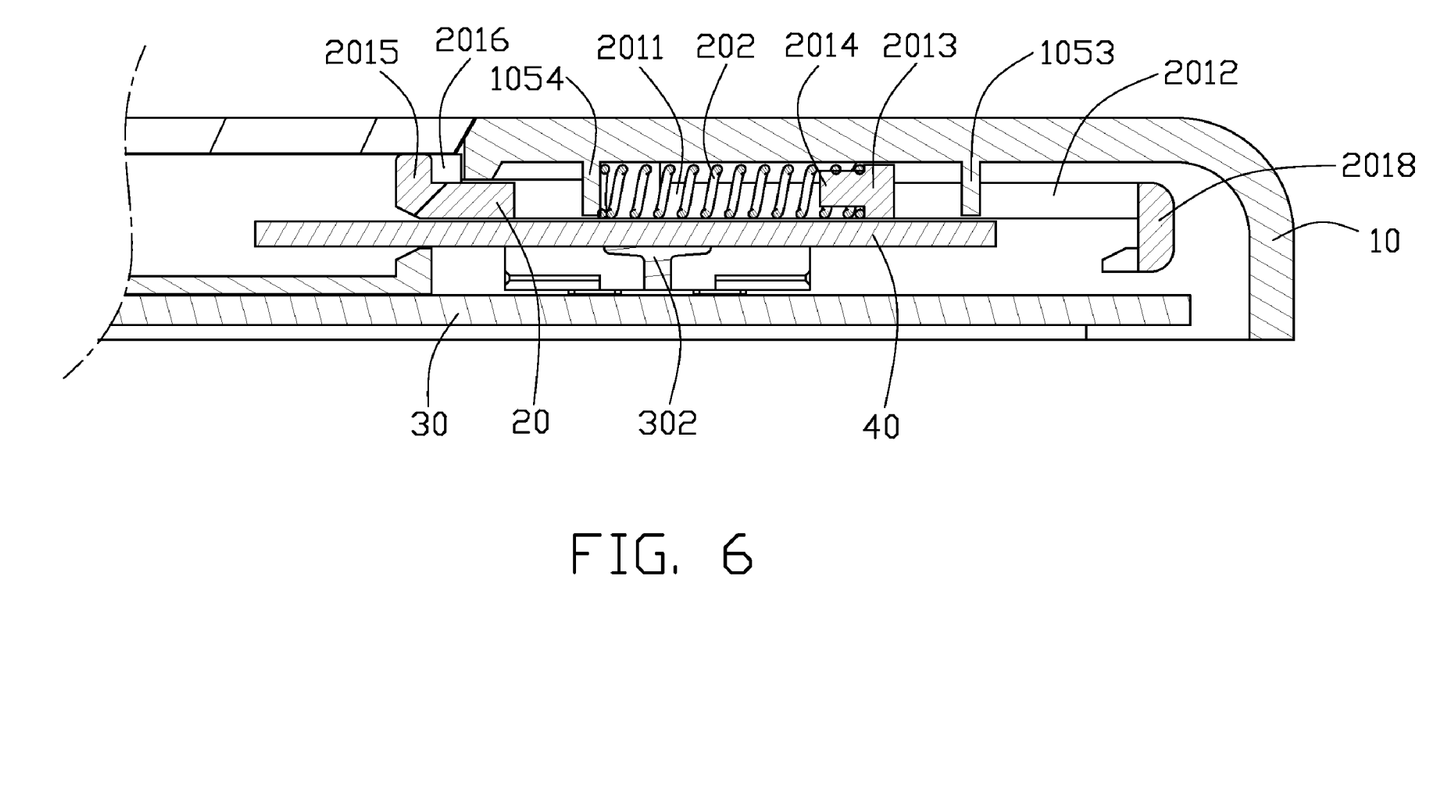
FIG. 6 is similar to FIG. 4, but showing the surface contact card holder in a third position.

Referring to FIGS. 5-6, to remove the surface contact card 40, the pulling lever 201 slides outward the receiving space 105 upon a user pulling the concavity 2016 (i.e., the grip or handle) of the operating portion 2015. Then the surface contact card 40 will be forced out of the receiving space 105 by the hook portion 2018 of the pulling lever 201. In such a status, the spring element 202 is compressed due to biasing thereof against the U-shaped resisting plate 1054. When a portion of the surface contact card 40 is pulled out a sufficient distance to permit gripping thereof by a user or by a separate gripping tool, the pulling lever 201 can be released. The pulling lever 201, upon its release, will be pushed back into the receiving space 105 under the force of the spring element 202 to a point where again the hook portion 2018 is at its maximum insert position (i.e., its maximum separation from the upright plate 1053). The surface contact card 40 will concordantly stop moving out through the card entrance 103 upon release of the pulling lever 201, leaving a portion thereof projecting out of the card entrance 103. Therefore, the surface contact card 40 can finally be fully removed by pulling on the portion projecting out of the card entrance 103.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A surface contact card holder for holding a surface contact card comprising:
    a body having a receiving space therein; and
    a guiding mechanism movably provided in the receiving space, the guiding mechanism being configured for selectably one of retaining the surface contact card in the receiving space and withdrawing the surface contact card from the receiving space, the guiding mechanism including a pulling lever and a spring element, one end of the spring element being fixed on the pulling lever and the other end of the spring element resisting the body;
    wherein the spring element is pressed when the guiding mechanism is pushed out from the receiving space, and the guiding mechanism automatically returns to its original position by rebounding of the spring element.

2. The surface contact card holder as claimed in claim 1, wherein the lever includes a main lever body, an operating portion is formed on one end of the main lever body and projects upwardly from the main lever body, a hook portion is formed on another end of the main lever body and projects downwardly from the main lever body, the operating portion is configured for facilitating the movement of the lever through the receiving space, and the hook portion is configured for holding and biasing one end of the surface contact card.

3. The surface contact card holder as claimed in claim 2, wherein the main lever body has a first rectangular hole and a second rectangular hole formed therein, the first rectangular hole is adjacent to the operating portion, a clapboard extends from the main lever body and is formed between the two holes, a fastening post is formed on the clapboard and projects toward the first rectangular hole, and the spring element is fastened on the fastening post.

4. The surface contact card holder as claimed in claim 3, wherein the receiving space communicates with a battery cavity through an entrance, the entrance is configured for allowing insertion of the surface contact card.

5. The surface contact card holder as claimed in claim 4, wherein the battery cavity includes an inner side wall, and the entrance is formed on the inner side wall.

6. The surface contact card holder as claimed in claim 5, wherein a channel is formed on the inner side wall above the entrance, and the channel has a smaller width than that of the entrance.

7. The surface contact card holder as claimed in claim 6, wherein the operating portion has a slight smaller width than that of the channel.

8. The surface contact card holder as claimed in claim 5, wherein the receiving space has a bottom wall, and a U-shaped resisting plate is formed on the bottom wall near the entrance, and the U-shaped resisting plate projects into the receiving space and is configured for resisting the spring element.

9. The surface contact card holder as claimed in claim 8, wherein an upright plate is formed on the body to define a border of the receiving space, and the upright plate extends from the bottom wall into the second rectangular hole and is thereby configured for preventing the lever from moving out of the receiving space.

10. The surface contact card holder as claimed in claim 9, wherein the receiving space is covered by a printed circuit board opposite the bottom wall.

11. The surface contact card holder as claimed in claim 10, wherein a surface contact connector is formed on the printed circuit board and faces the receiving space.

12. The surface contact card holder as claimed in claim 11, wherein two side boards are formed at two opposing sides of the receiving space.

13. The surface contact card holder as claimed in claim 12, wherein two slide plates are formed at two opposing sides of pulling lever, the slide plates being configured to slide on the side boards.

14. A surface contact card holder for holding a surface contact card comprising:
   a body having a receiving space therein; and
   a guiding mechanism movably provided in the receiving space, the guiding mechanism including:
      a pulling lever including a main lever body and a hook portion, the hook portion being formed on one end of the main lever body for holding and biasing one end of the surface contact card; and
      a spring element, one end of the spring element fixed on the pulling lever, the other end of the spring element resisting the body, the spring element being configured for being pressed when the pulling lever is pushed out from the receiving space, and rebounding so as to push the pulling lever to original position when the pressure on the pulling lever is released;
   wherein the guiding mechanism is configured for selectably one of retaining the surface contact card in the receiving space and withdrawing the surface contact card from the receiving space.

15. The surface contact card holder as claimed in claim 14, wherein an operating portion is formed on another end of the main lever body and projects upwardly from the main lever body, and the operating portion is configured for facilitating the movement of the lever through the receiving space.

16. The surface contact card holder as claimed in claim 14, wherein a U-shaped resisting plate projects from a bottom wall of the body, and the resisting plate is configured for resisting another end of the spring element.

17. The surface contact card holder as claimed in claim 14, further comprising two guide plates on a printed circuit board fixed in the body, wherein the pulling lever further includes two slide plates extending from two opposite sides of the pulling lever, and each guide plate is configured for resisting one of the two slide plates.

18. The surface contact card holder as claimed in claim 17, wherein two side boards are formed at two opposing sides of the receiving space, and each side board corresponds to one of the guide plates.

19. The surface contact card holder as claimed in claim 14, wherein the main lever body has a hole defined therein, a clapboard is formed in the holes, a fastening post is formed on the clapboard, and the spring element is fastened on the fastening post.

20. The surface contact card holder as claimed in claim 19, wherein an upright plate projects from a bottom wall of the body, and the upright plate is received in the hole of the main lever body and is configured for limiting the potential travel path of the clapboard and the hook portion.

* * * * *